INVENTOR.
JAMES R. WILLSON

June 18, 1968  J. R. WILLSON  3,388,865
CONTROL DEVICE AND PARTS THEREFOR
Filed Dec. 2, 1964  9 Sheets-Sheet 3

INVENTOR.
JAMES R. WILLSON
BY
Cander & Cander
HIS ATTORNEYS

June 18, 1968  J. R. WILLSON  3,388,865
CONTROL DEVICE AND PARTS THEREFOR
Filed Dec. 2, 1964  9 Sheets-Sheet 4

INVENTOR.
JAMES R. WILLSON
BY
*Candor & Candor*
HIS ATTORNEYS

June 18, 1968 J. R. WILLSON 3,388,865
CONTROL DEVICE AND PARTS THEREFOR
Filed Dec. 2, 1964 9 Sheets-Sheet 6

INVENTOR.
JAMES R. WILLSON
BY
Caudor & Caudor
HIS ATTORNEYS

June 18, 1968   J. R. WILLSON   3,388,865
CONTROL DEVICE AND PARTS THEREFOR
Filed Dec. 2, 1964   9 Sheets-Sheet 9
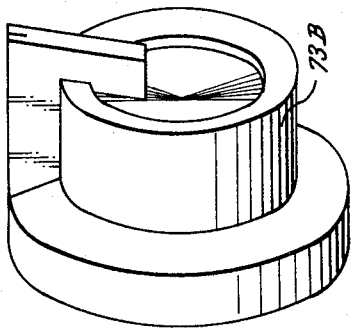
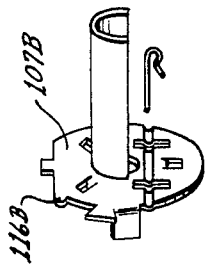
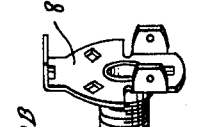
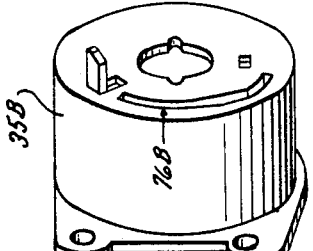
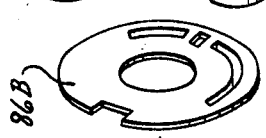
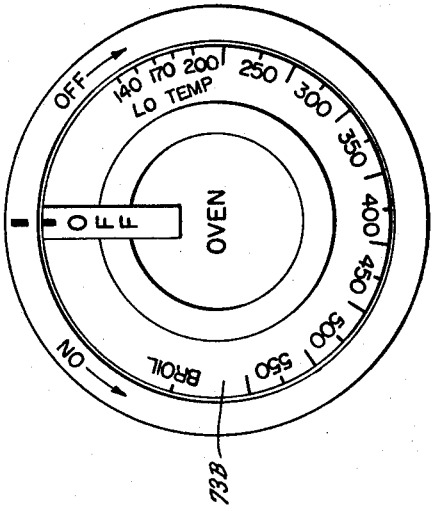
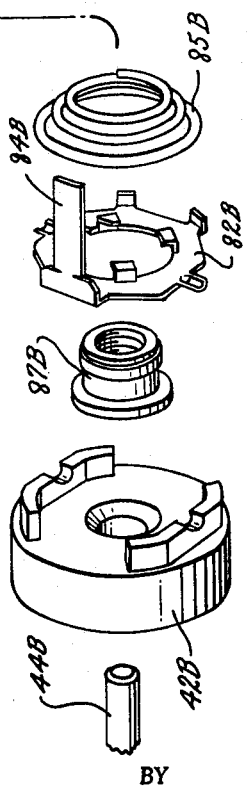
INVENTOR.
JAMES R. WILLSON
BY
Cauden & Cauden
HIS ATTORNEYS

United States Patent Office 3,388,865
Patented June 18, 1968

3,388,865
CONTROL DEVICE AND PARTS THEREFOR
James R. Willson, Greensburg, Pa., assignor to Robertshaw Controls Company, Richmond, Va., a corporation of Delaware
Filed Dec. 2, 1964, Ser. No. 415,264
15 Claims. (Cl. 236—99)

This invention relates to an improved control device for a fuel burning appliance or the like as well as to improved parts for such a control device or the like.

In particular, this invention relates to improved control devices which can be readily utilized to thermostatically control the heating operations of the oven means and the top burner means of cooking apparatus or the like.

The control devices of this invention are so constructed and arranged that many of the parts thereof can be utilized in different applications thereof whereby many of the novel features are common to the various control devices of this invention.

Further, the parts of the control devices of this invention are simply and economically manufactured so that the same can be readily and simply assembled together to form the desired control device of this invention.

For example, one control device of this invention can be utilized for thermostatically controlling a match lit oven or the like. Another control device of this invention can be utilized for controlling the top burner of a cooking apparatus or the like wherein the control thermostatically controls the operation of the burner means so that the temperature of the cooking vessel on the burner means will be maintained at a selected temperature. Another control of this invention is readily adapted to control the burner means of an oven or the like so that the oven will maintain a uniform temperature even though the burner means is cycled between its "on" and "off" positions.

Accordingly, it is an object of this invention to provide an improved control device or the like having one or more of the novel features set forth above or hereinafter shown or described.

Another object of this invention is to provide improved parts for such a control device or the like.

Other objects, uses and advantages of this invention are apparent from a reading of this description which proceeds with reference to the accompanying drawings showing a part thereof and wherein:

FIGURE 20 is an exploded perspective view of various parts of the control device of FIGURE 18.

FIGURE 21 is an end view of the control knob and bezel ring of the control device of FIGURE 18.

Figure 1:
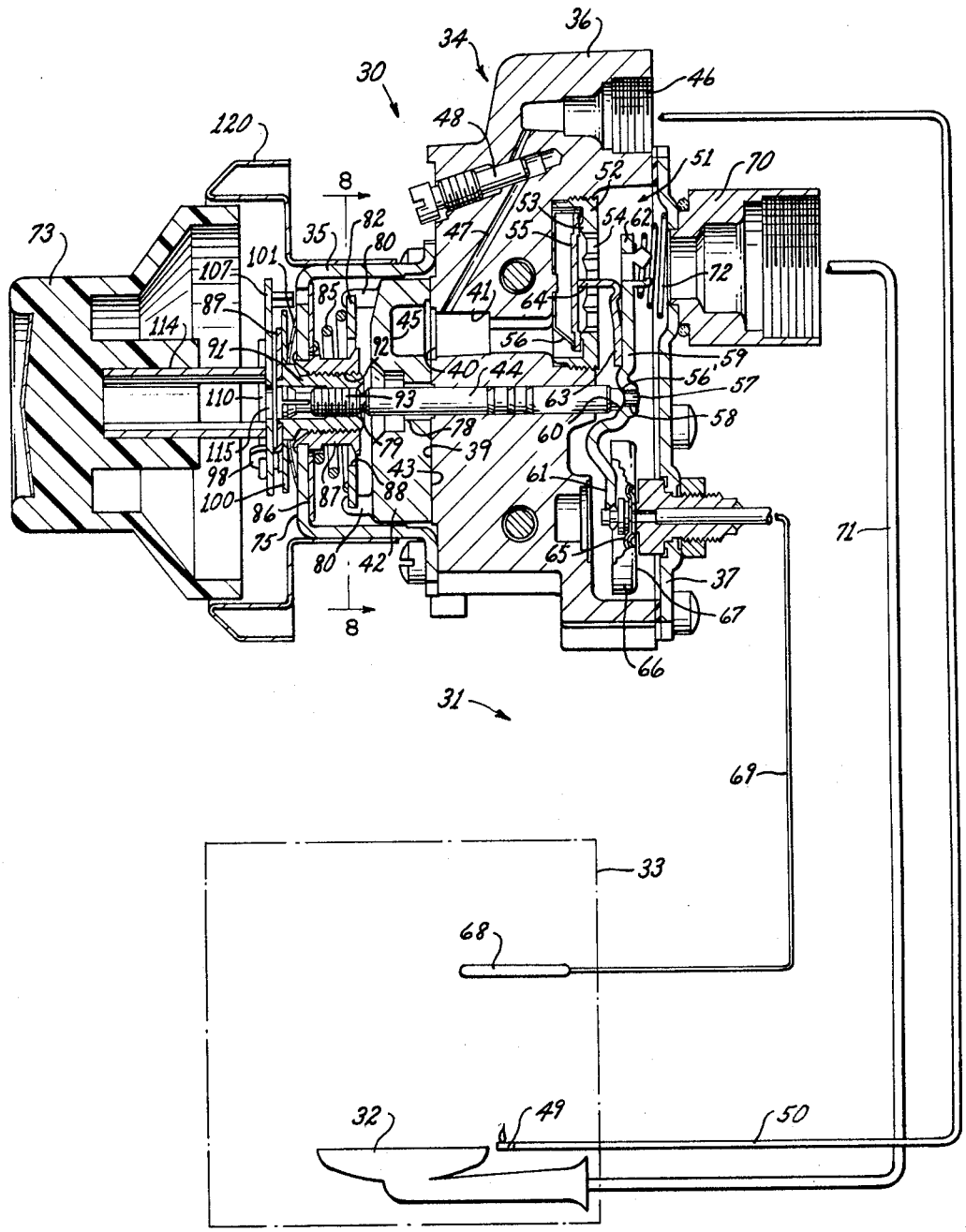
FIGURE 1 is a cross-sectional schematic view illustrating one control device of this invention.

While the various features of this invention are hereinafter described and illustrated as being particularly adaptable for use in a cooking apparatus or the like, it is to be understood that the various features of this invention can be utilized singly or in any combination thereof to provide other control devices or the like.

Therefore, this invention is not to be limited to only the embodiments illustrated in the drawings, because the drawings are merely utilized to illustrate some of the wide variety of uses of this invention.

Referring now to FIGURE 1, an improved control device of this invention is generally indicated by the reference numeral 30 and is illustrated as being utilized in a system 31 for controlling the operation of a burner means 32 disposed in a cooking oven 33 or the like.

The control device 30 includes a housing means 34 formed of three parts 35, 36 and 37 suitably interconnected together in sealing relation. The housing part 36 has a fuel inlet 38, FIGURE 5, which is interconnected to a flat side 39 of the housing part 36 by a port (not shown) disposed adjacent a port 40 formed in the surface 39 and interconnected to a passageway 41 formed in the housing part 36.

A disc or face valve member 42 is disposed between the housing parts 35 and 36 and has a flat surface 43 disposed in sliding and sealing relationship with the surface 39 for a purpose hereinafter described, the disc valve 42 being rotatably mounted on an axially movable pin or shaft 44 carried by the housing part 36. The side 43 of the disc valve 42 has a channel means 45 provided therein which is adapted to interconnect the inlet port (not shown) with the outlet port 40 in the housing member 36 in varying degrees for a purpose hereinafter described.

The passageway 41 formed in the housing 36 is interconnected to a pilot outlet port 46 by a branch passageway 47 having a suitable adjusting screw 48 disposed therein to set the desired degree of flow between the passageway 41 and the pilot outlet port 46. The pilot outlet port 46 is interconnected to a pilot burner 49 by a conduit means 50, the pilot burner 49 being disposed adjacent the main burner means 32 to ignite fuel issuing therefrom in a manner hereinafter described.

The passageway 41 formed in the housing member 36 communicates with a chamber 51 formed between the housing parts 36 and 37. However, a valve seat member 52 is disposed in the passageway 41 and has an annular valve seat 53 surrounding an opening 54 therein. The valve seat 53 is adapted to be opened and closed by a valve member 55 normally urged to the closed position by a spring means 56.

The pin 44, previously described, has a rounded end 56′ provided with a reduced cylindrical portion 57 which is received in an aperture 58 in a lever 59, the lever 59 having an arcuate surface 60 resting on the rounded end 56 of the pin 44 whereby the lever 59 is fulcrumed on the pin 44 intermediate the ends 61 and 62 of the lever 59.

The end 62 of the lever 58 carries an L-shaped arm 63 having an end 64 engaging the valve member 55 whereby pivotal movement of the lever 59 in a counter-clockwise direction about the end 56 of the pin 44 will open the valve member 55 in opposition to the force of the spring means 56.

The end 61 of the lever 58 bears against a movable wall 65 of a temperature responsive device 66 having a wall 67 fixed to the housing member 37 in any suitable manner, the interior of the temperature responsive device 66 being interconnected to a temperature sensing bulb 68 disposed in the oven 33 by a conduit means 69.

The housing part 37 carries an outlet plug 70 which is adapted to interconnect the chamber 51 with the main burner means 32 by means of a conduit 71.

A compression spring 72 is disposed between the housing part 37 and the end 62 of the lever 59 to hold the lever 59 in engagement with the end 56′ of the pin 44.

The rotational movement of the valve member 42 to interconnect the fuel inlet 38 with the passageway 41 is controlled by rotational movement of a control knob 73 carried by the housing means 34 in a manner hereinafter described, the rotational movement of the control knob 73 also controlling the axial position of the fulcrum pin 44 in a manner hereinafter described.

Figure 2:
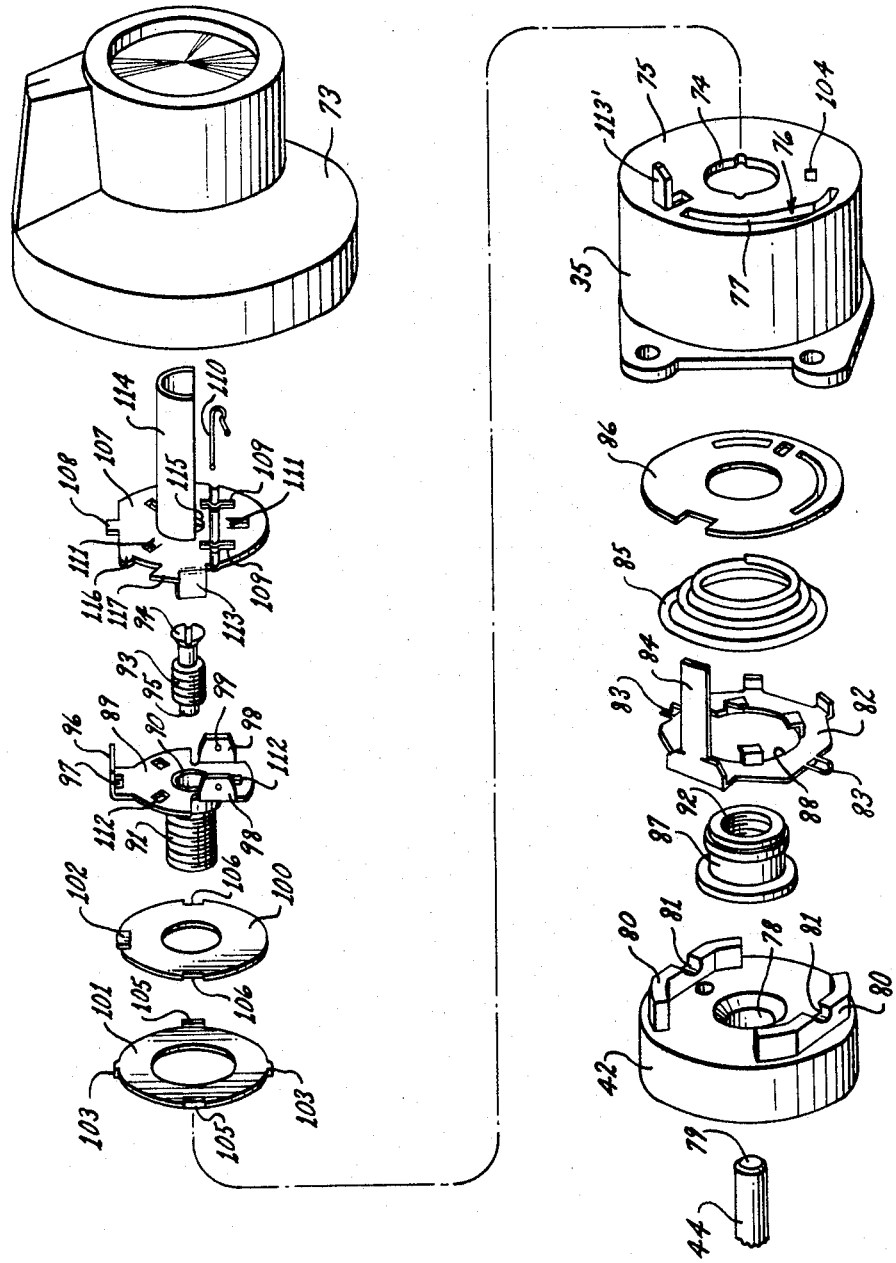
FIGURE 2 is an exploded perspective view of various parts of the control device of FIGURE 1.

As illustrated in FIGURES 1 and 2, the housing part 35 has a central opening 74 passing through the closed end 75 thereof. In addition, a cam slot 76 is formed through the end 75 of the housing part 35 to define a cam edge 77 for a purpose hereinafter described.

The valve member 42 has a central opening 78 passing therethrough to receive the end 79 of the fulcrum pin 44 in the manner illustrated in FIGURE 1. The valve member 42 also carries a pair of raised ridges 80 each provided with a recess 81 aligned with the recess 81 in the other ridge 80.

Figure 6:
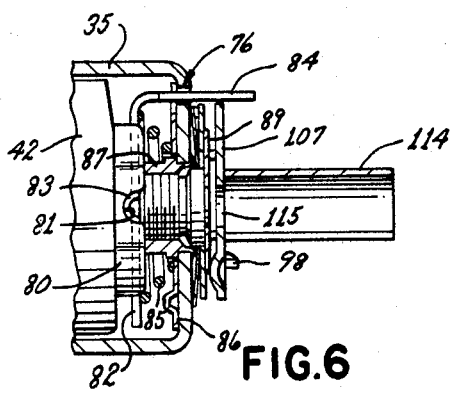
FIGURE 6 is a fragmentary cross-sectional view taken on line 6—6 of FIGURE 5.
Figure 8:
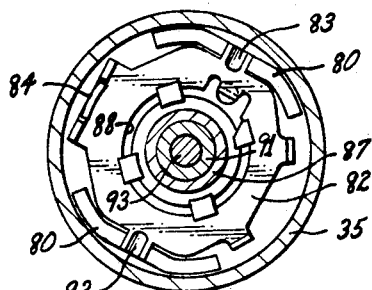
FIGURE 8 is a cross-sectional view taken on line 8—8 of FIGURE 1 with background structure removed.

A drive member 82 is provided and has a pair of arcuate extensions 83 each being adapted to be received in the recesses 81 of the valve member 42 in the manner illustrated in FIGURE 6 whereby rotational movement of the drive member 82 in the manner hereinafter described causes like rotational movement of the valve member 42. However, the drive member 82 can rock relative to the valve member 42 even though the projections 83 are in the recesses 81 thereof for a purpose hereinafter described.

The drive member 82 has a projection 84 extending at right angles relative thereto and adapted to project through the cam slot 76 in the housing member 35.

When the housing part 35 is assembled to the housing part 36, a compression spring 85 is disposed between the drive member 82 and a plate 86 which rests against the inside surface of the closed end 75 of the housing part 35 whereby the compression spring 85 maintains the drive member 82 in driving relation with the valve member 42 by holding the projections 83 of the drive member 82 in the recesses 81 of the valve member 42.

An internally threaded tubular member 87 is fixed in the opening 74 of the housing part 35 for a purpose hereinafter described, the tubular member 87 being adapted to be received in an opening 88 formed in the drive member 82 in the manner illustrated in FIGURE 1.

A plate-like member 89 has an opening 90 therein and receives a hollow tubular member 91, the tubular member 91 being fastened to the plate member 89 in any suitable manner. The hollow tubular member 91 is exteriorly threaded to be threadedly received in the threaded bore 92 of the tubular member 87.

The tubular member 91 is also internally threaded to threadedly receive an adjusting screw 93 having a bifurcated end 94 and a cylindrical end 95, the end 95 of the adjusting screw 93 being adapted to abut against the end 79 of the fulcrum end 44 for a purpose hereinafter described.

The plate member 89 has a bent flange 96 provided with a slot 97. In addition, the plate member 89 has a pair of ears 98 extending therefrom and respectively provided with aligned apertures 99 passing therethrough.

When the plate-like member 89 is assembled to the tubular member 87 by being threadedly received in the threaded bore 92 of the tubular member 87 in the manner illustrated in FIGURE 1, a washer-like member 100 is disposed between the plate member 89 and the closed end 75 of the housing part 35, a washer-like bowed spring member 101 being disposed between the washer 100 and the housing part 35 to urge the washer-like member 100 into engagement with the plate-like member 89. The washer-like member 100 has an outwardly directed tang 102 receivable in the slot 97 of the plate-like member 89 to tend to prevent rotational movement of the plate-like member 89 as the washer-like member 100 is held from rotational movement relative to the housing part 35 by the spring 101.

In particular, the spring 101 has projections 103 received in suitable openings 104 in the housing part 35 and has tangs 105 receivable in notches 106 of the washer-like member 100. Thus, as long as the washer-like member 100 is urged against the plate-like member 89 by the spring means 101, the tang 102 thereof is received in the slot 97 of the plate-like member 89 and prevents rotational movement of the plate-like member 89 relative to the housing part 35.

Another plate-like member 107 is provided and has an outwardly directed tang 108 adapted to be received in the slot 97 of the plate-like member 89 while receiving the ears 98 thereof through suitable slots 109.

After the ears 98 of the plate-like member 89 have been received in the slots 109 of the plate-like member 107, a suitable fastening pin 110 fixes the plate-like members 107 and 89 in assembled relation by passing through the aperture 99 of the ears 98, the plate-like member 107 having a plurality of outwardly bent tangs 111 receivable through openings 112 in the plate-like member 89 to bear against the washer-like member 100 whereby the force of the spring 101 tends to maintain the parts 107 and 89 in spaced relation.

The plate-like member 107 has an outwardly directed tang 113 adapted to abut a stop member 113′ on the housing part 35 for a purpose hereinafter described. In addition, the plate-like member 107 has a C-shaped shaft 114 fixed around an opening 115 therein whereby the bifurcated end 94 of the adjusting screw 93 can be received through the opening 115 of the plate-like member 107.

The plate-like member 107 has a pair of tangs 116 and 117 for driving the drive member 82 in a manner hereinafter described.

The control knob 73 is adapted to be detachably fastened on a C-shaped shaft 114 to complete the assembly of the control device 30.

The operation of the control device 30 will now be described.

Figure 3:
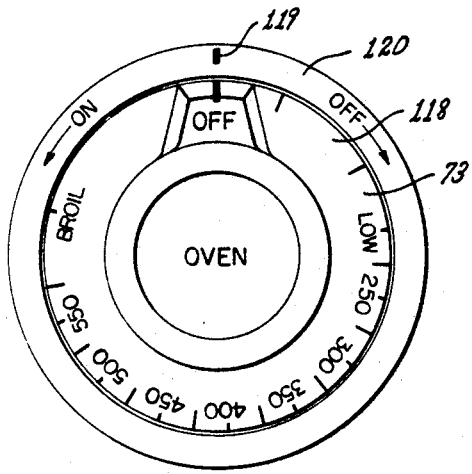
FIGURE 3 is a front view of the control dial and bezel ring of the control device of FIGURE 1.
Figure 4:
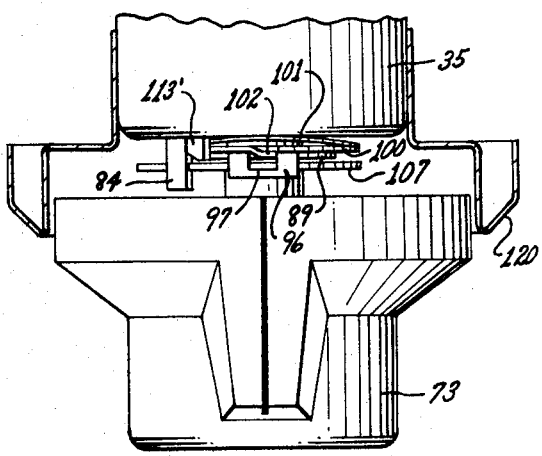
FIGURE 4 is a fragmentary, top view of the control device illustrated in FIGURE 1 with part of the structure disclosed in cross section.
Figure 7:
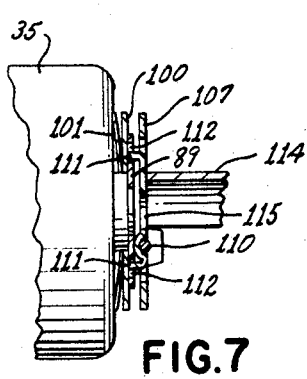
FIGURE 7 is a fragmentary, cross-sectional view taken on line 7—7 of FIGURE 5.
Figure 5:
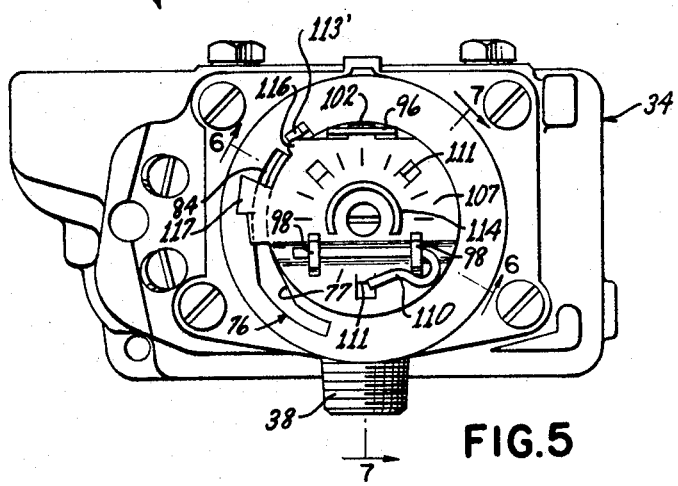
FIGURE 5 is an end view of the control device of FIGURE 1 with the control knob and bezel ring removed.

With the control knob 73 disposed in the "off" position as illustrated in FIGURES 3 and 4 and 5, the channel 45 in the valve member 42 is in such a position that the fuel inlet 38 is not interconnected to the passage 41 in the housing part 36. In addition, the axial position of the pin 44 is such that regardless of the temperature sensed by the sensing bulb 68, the lever 59 is in such a position that the valve member 55 is fully disposed against the valve seat 53.

However, before the control knob 73 can be rotated from its "off" position toward the pilot light position thereof, the control knob 73 must be inwardly depressed toward the housing means 34 in order to permit the tangs 111 on the plate-like member 107 to move the washer-like member 100 back sufficiently so that the tang 102 of the washer-like member 100 will clear the slot 97 in the plate-like member 89 and permit the plate-like member 89 to be rotated relative thereto.

The operator, then turns the control knob 73 in a counterclockwise direction in FIGURE 3 until the control knob 73 has the portion 118 thereof disposed adjacent the indicating pointer 119 on the bezel ring 120 whereby sufficient fuel is interconnected from the inlet 38 to the passage means 41 by the moved valve member 42 to permit the fuel to issue from the pilot burner 49 and be ignited either automatically or manually, the valve member 42 being rotated by rotational movement of the control knob 73 as the tang 116 on the plate-like member 107 is bearing against the projection 84 of the drive member 82 and moves the same therewith in the cam slot 76.

After the pilot burner 49 has been lit, the control knob 73 is moved in a counterclockwise direction toward the desired temperature setting thereof. However, as the control knob 73 is being rotated in a counterclockwise direction, the tang 84 of the drive member 82 rides against the cam edge 77 of the cam slot 76 until the same is cammed outwardly in the manner illustrated in FIGURE 9 so that further rotation of the control knob 73 in a counterclockwise direction will not carry the drive member 82 therewith because the tang 84 has been cammed outwardly such a radial distance that the tang 116 of the plate-like member 107 moves beyond the same, the tang 84 when being cammed outwardly by the cam edge 77 causing the drive member 82 to rock relative to the valve member 42 while still being in driving relationship relative thereto.

Figure 9:
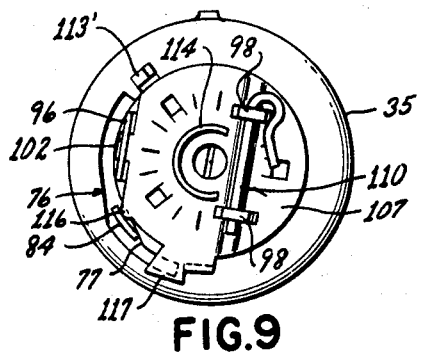
FIGURE 9 is a view similar to FIGURE 5 and illustrates the control device of FIGURE 1 in one operating position thereof.
Figure 10:
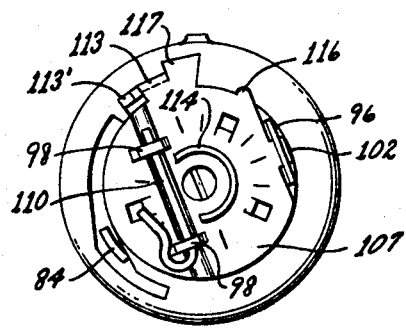
FIGURE 10 is a view similar to FIGURE 9 and illustrates the control device of FIGURE 1 in another operating position thereof.
Figure 15:
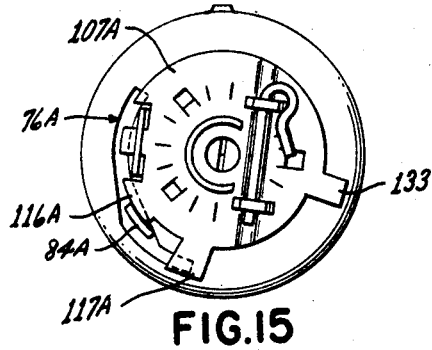
FIGURE 15 is a view similar to FIGURE 9 and illustrates the control device of FIGURE 11 in one operating position thereof.

However, when the projection 84 of the drive member 82 has been moved to the position illustrated in FIGURE 9, the valve member 42 is in such a position the valve member 42 interconnects the inlet 38 with the passage means 41 in such a manner that a full flow of fuel is effected therebetween.

Thus, when the operator sets the control knob 73 in the desired temperature setting position, the rotational movement of the control knob 73 causes the threaded member 91 to be moved outwardly relative to the tubular member 87 whereby the fulcrum pin 44 is adapted to axially move to the left in FIGURE 1 to a position corresponding to the temperature setting of the control knob 73.

This movement of the fulcrum pin 44 is such that the lever 59 opens the valve member 55 away from the valve seat 53 to interconnect the source of fuel with the main burner means 32 which will be ignited by the pilot 49.

The valve member 55 remains in the open position until the temperature in the oven 33 approaches the selected temperature whereby the expanding fluid in the temperature responsive element 66 causes the wall 65 thereof to move outwardly to the left in FIGURE 1 to pivot the lever 59 in such a manner that the valve member 55 will close terminating the supply of fuel to the burner means 32.

Conversely, when the temperature of the oven 33 falls below the selected temperature, the wall 65 of the temperature responsive device 66 has moved to the right sufficiently to permit the lever 59 to again open the valve member 55 so that fuel can issue from the burner means 32.

In this manner, it can be seen that the flow of fuel to the burner means 32 will be cycled "on" and "off" to maintain the temperature in the oven 33 at the temperature selected by the control knob 73.

Thus, the axial position of the fulcrum pin 44 depends upon the axial position of the threaded member 91 relative to the tubular member 87. However, in order to calibrate the device 30, the calibration screw 93 can be initially adjusted relative to the threaded member 91 as the adjusting screw 93 abuts against the end 79 of the pin 44, access to the adjusting screw 93 being effected by removing the control knob 73 and bezel ring 120 and inserting a screwdriver in the aperture 115 of the plate-like member 107.

The movement of the control knob 73 in the "on" direction is limted by the tang 113 on the plate member 107 abutting the stop means 113' on the housing part 35.

When it is desired to turn the oven 33 to its "off" position, the operator grasps the control knob 73 and rotates the same in a clockwise direction whereby the tang 117 of the plate-like member 107 eventually comes into contact with the projection 84 of the drive member 82 and carries the same therewith back to the "off" position as illustrated in FIGURE 5 whereby the valve member 42 prevents communication between the fuel inlet 38 and the passage means 41 while at the same time adjusting the axial position of the fulcrum pin 44 so that the valve member 55 will be disposed in its closed position regardless of the temperature of the oven 33, such movement of the control knob 73 in a clockwise direction being limited by the tang 84 engaging the end of the cam slot 76. When the control knob 73 is in the "off" position thereof, the tang 102 of the washer 100 snaps into the slot 97 of the member 89 to prevent rotational movement of the control knob 73 until the control knob is depressed inwardly in the manner previously described.

Therefore, it can be seen that the control device 30 of this invention is effective to not only control rotary movement of a face valve member but also to adjust the axial position of a fulcrum pin which controls the opening and closing of another valve member, the control device having means for automatically locking the same in the "off" position until the control knob is depressed to permit rotational movement thereof.

Further, it can be seen that the control device 30 of this invention readily utilizes a cam slot to provide disengagement between the control knob and the main valve member so that the control knob can be utilzed to adjust other structure, such as shaft 44, after the same has properly adjusted the main valve member.

Referring now to FIGURES 11–14, another control device of this invention is generally indicated by the reference numeral 125 and parts thereof similar to the control device 30 are indicated by like reference numerals followed by the reference letter A.

Figure 11:
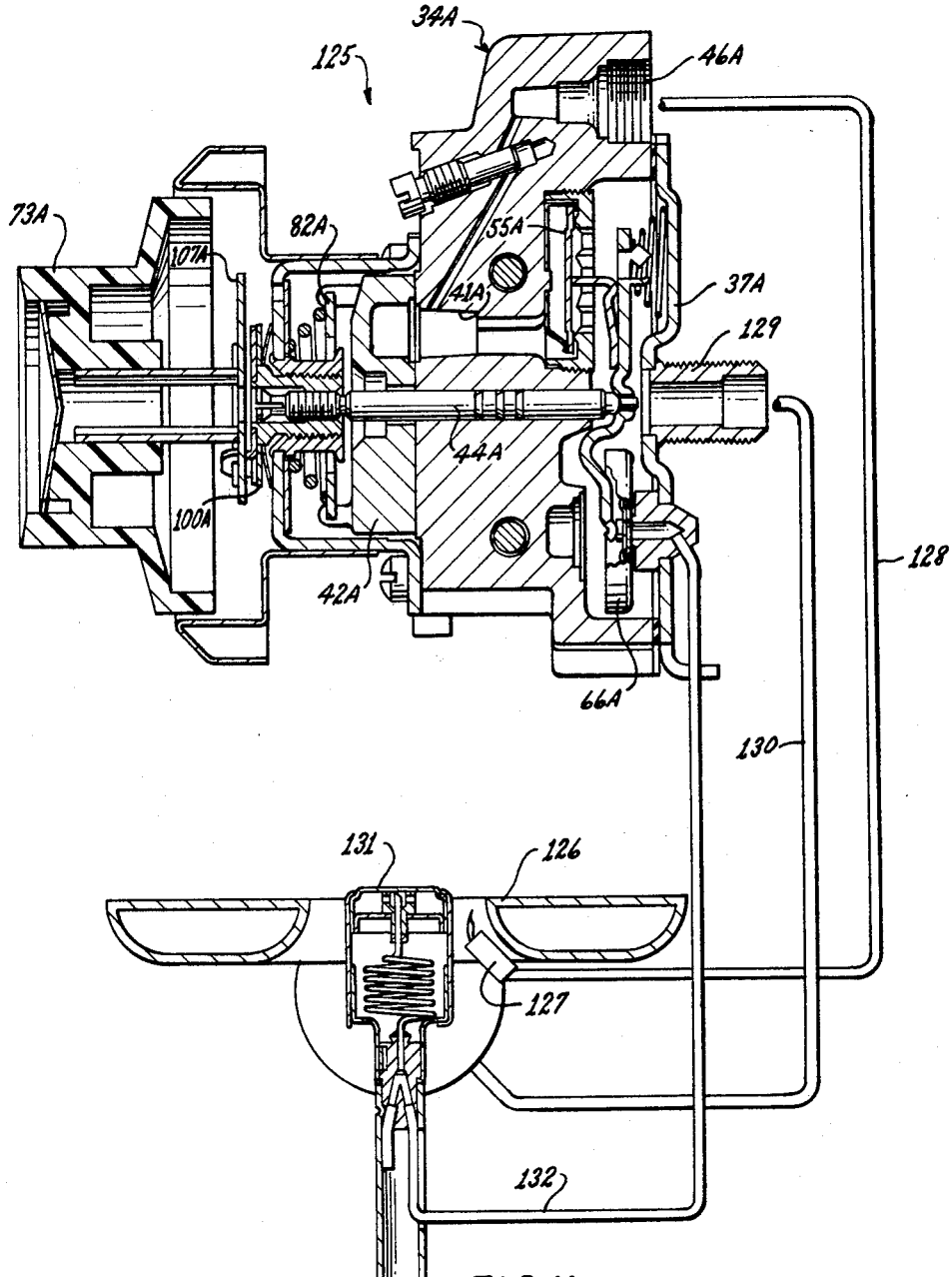
FIGURE 11 is a view similar to FIGURE 1 and illustrates another control device of this invention.

As illustrated in FIGURE 11, the control device 125 is adapted to thermostatically control the temperature effect produced by a top burner means 126 of a domestic cooking apparatus or the like. In particular, the pilot outlet part 46A of the housing means 34A is interconnected to a pilot burner 127 by a conduit 128, the pilot burner 127 being so constructed and arranged since the same is adapted to ignite fuel issuing from the main burner means 126.

The fuel for the main burner means 126 is adapted to be conveyed to the burner means 126 from an outlet nipple 129 carried by the housing part 37A and interconnected thereto by a conduit means 130.

The thermostatic temperature responsive element 66A of the control device 125 has the interior thereof interconnected to a temperature sensing bulb means 131 by a conduit means 132, the temperature bulb 131 operating in a conventional manner for the burner means 126 to sense the temperature of a cooking vessel resting on the burner means 126.

Figure 12:
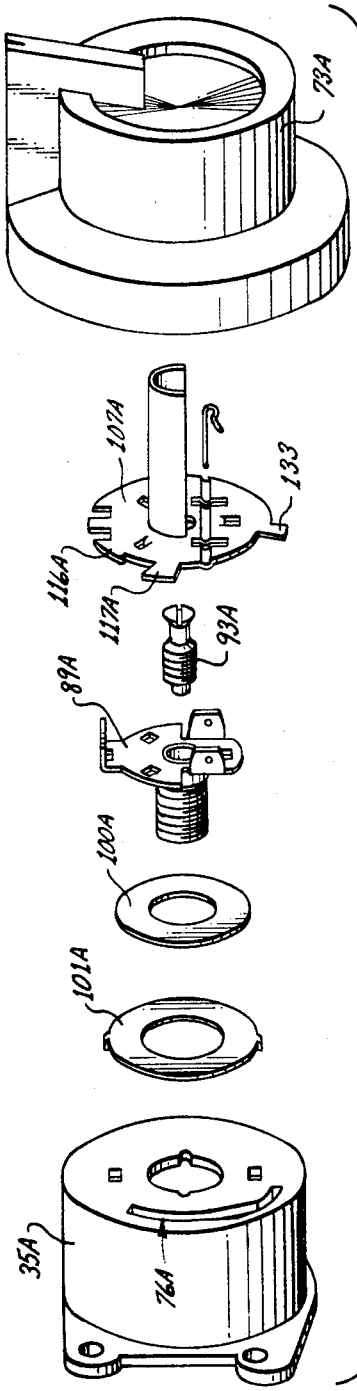
FIGURE 12 is an exploded perspective view of various parts of the control device of FIGURE 11.

As illustrated in FIGURE 12, the drive means for interconnecting the fulcrum pin 44A and the main valve means 42A with the control knob 73A are the same as for the control device 30 previously described except that the washer-like member 100A of the control device 125 does not have the locking tang 102 and the plate-like member 107A has another tang 133 in addition to the tangs 116A and 117A previously described for a purpose hereinafter described.

Therefore, the details of the control device 125 are substantially the same as the details of the control device 30 whereby further explanation of the device 125 is not necessary.

The operation of the control device 125 will now be described.

Figure 14:
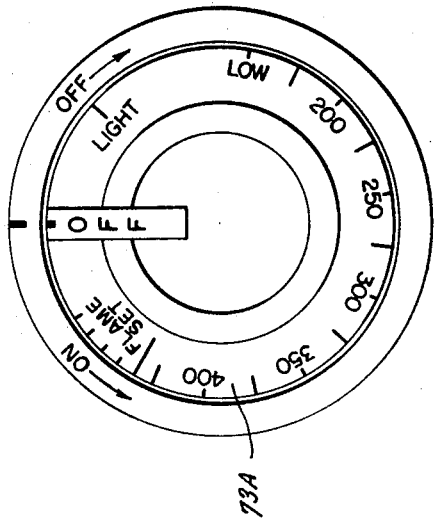
FIGURE 14 is a front view of the control knob and bezel ring of the control device of FIGURE 11.
Figure 13:
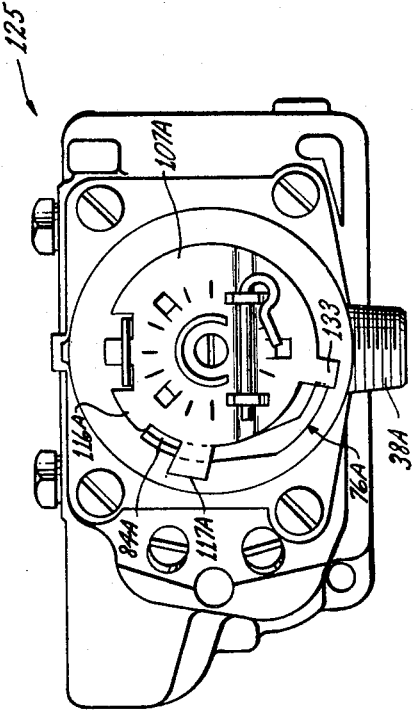
FIGURE 13 is an end view of the control device illustrated in FIGURE 11 with the control knob and bezel ring removed.

With the control knob 73A disposed in the "off" position as illustrated in FIGURE 14, it can be seen that the valve member 42A does not interconnect the fuel inlet 38A with the passage means 41A while the fulcrum pin 44A is disposed in such an axial position that the valve member 55A remains in its closed position regardless of the temperature being sensed by the sensing means 131.

However, when the operator turns the control knob 73A to the "light" position, the valve member 42A interconnects the fuel inlet 38A to the passage means 41A so that fuel will issue from the pilot burner 127 to be ignited manually or automatically.

Thereafter, the control knob 73A is turned to the desired temperature setting whereby at the first temperature setting thereof, the valve member 42A is in its full "on" position and further rotation thereof is prevented by the cam slot 76A camming the projection 84A of the drive member 82A out of engagement with the tang 116A on the member 107A in the manner previously described. At this time, the axial position of the pin 44A is such that the valve member 55A is opened and fuel can issue to the burner means 126 and be ignited by the pilot burner 126.

Figure 16:
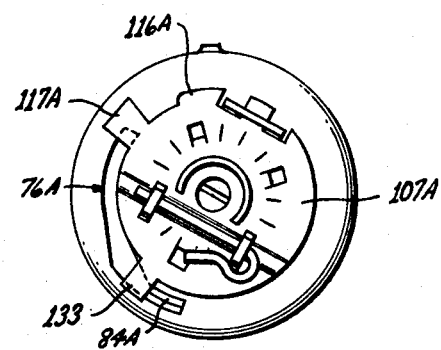
FIGURE 16 is a view similar to FIGURE 15 and illustrates the control device of FIGURE 11 in another operating position thereof.

However, should the operator desire to reduce the size of the flame at the burner means 126 while having the burner means 126 maintain the temperature of the cooking vessel resting thereon at a desired temperature, the operator merely continues to turn the control knob 73A in a counterclockwise direction until it comes to the "flame-set" region thereof whereby the additional tang 133 on the member 107A will engage the cammed projection 84A of the drive member 82A in the manner illustrated in FIGURE 16 and carry the same therewith until the flame has been reduced to the desired setting, the projection 84A being limited in its movement in the "flame-set" region by the end of the cam slot 76A. After the flame has been set at the desired height, the operator merely advances the control knob 73A back to the desired temperature setting therefor whereby the fulcrum pin 44A will be adjusted to the proper axial position thereof for the temperature setting of the control knob 73A.

Thus, as long as the temperature of the cooking vessel is below the selected temperature, the temperature responsive device 66A permits the valve member 55A to be disposed in its open position. When the temperature of the cooking vessel reaches the selected temperature, the power element 66A has expanded to such a degree that the valve member 55A is moved to its closed position until the power element 66A collapses due to a sensing of temperature by the sensing means 131 below the selected temperature.

Therefore, it can be seen that the control device 125 of this invention is not only readily adaptable to control the temperature effect that is produced by the burner means 126, but also is adapted to set the flame height at the burner means 126 at the desired degree.

Further, it can be seen that the structure of the control devices 30 and 125 previously described are substantially identical so that the same can be adapted for either oven operation or top burner operation with merely a few minor changes in the basic parts thereof in the manner previously described.

Another control device of this invention is generally indicated by the reference numeral 135, FIGURES 17–21, and comprises a housing means 136 formed of parts 35B, 137 and 138 suitably secured together, certain parts of the control device 135 that are substantially identical to the parts of the control device 30 previously described will be designated by like reference numerals followed by the reference letter B.

Figure 17:
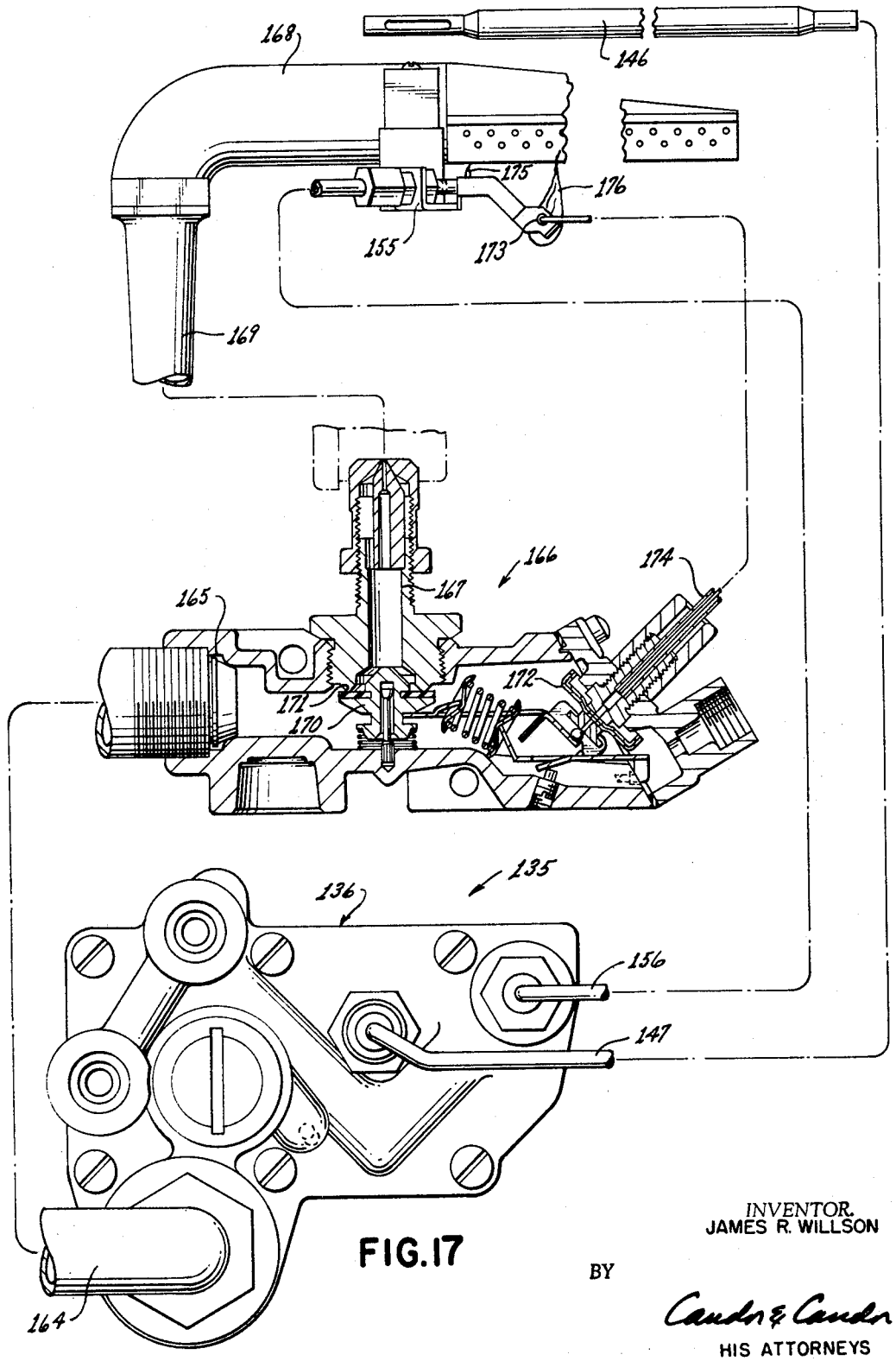
FIGURE 17 is a schematic view illustrating another control device of this invention.
Figure 18:
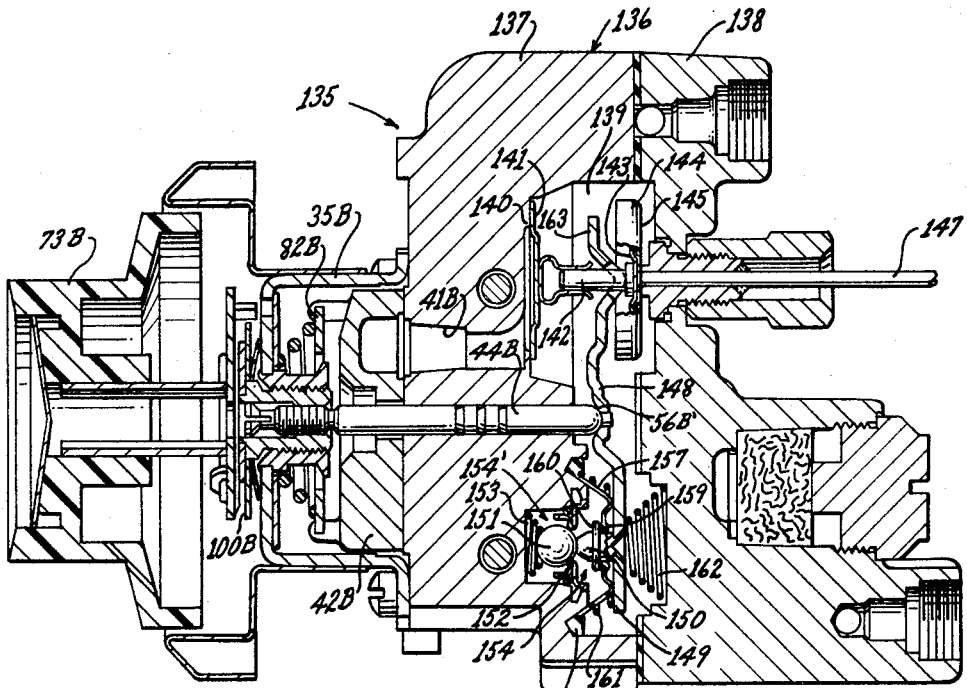
FIGURE 18 is a cross-sectional view of the control device illustrated in FIGURE 17 and is taken on line 18—18 of FIGURE 19.
Figure 19:
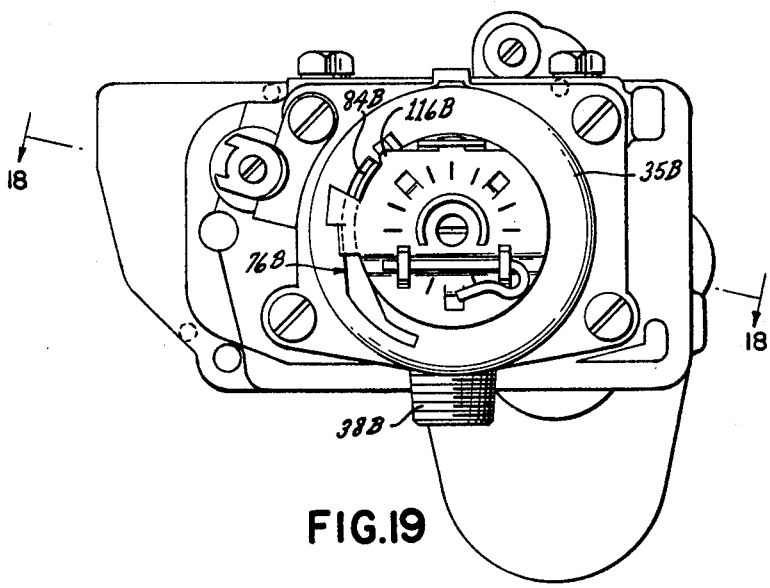
FIGURE 19 is an end view of the control device illustrated in FIGURE 18 with the control knob and bezel ring removed.

As illustrated in FIGURE 18, the passage means 41B formed in the housing part 137 is in communication with a chamber 139 formed between the housing parts 137 and 138. However, the passageway 41B and the chamber 139 are separated from each other by an annular valve seat 140 adapted to be opened and closed by a valve member 141 carried on a shaft-like extension 142 of the movable wall 143 of a temperature responsive device 144. The temperature responsive device 144 has a wall 145 fixed to the housing part 138 and has the interior thereof interconnected to a temperature sensing bulb 146, FIGURE 17, by a conduit means 147.

A lever 148 is fulcrumed on the end 56B' of the fulcrum pin 44B in the manner similar to the lever 59 previously described.

However, the end 149 of the lever 148 carries a projection 150 adapted to abut a ball valve member 151 urged toward a valve seat 152 by a compression spring 153. In this manner, the ball valve 151 controls communication between a chamber 154 and a chamber 154' leading to a pilot burner means 155 by means of a conduit means 156.

A flexible diaphragm 157 has its outer periphery 158 sealed against the housing part 137 while the inner periphery 159 is snap-fitted over an annular flange 160 of the projection 150, a light compression spring 161 being disposed between the end 149 of the lever 148 and the outer periphery 158 of the diaphragm 157 to hold the same in its sealing relation with the housing part 137 whereby the diaphragm 157 defines part of the chamber 154.

The chamber 154 is interconnected by a branch passageway (not shown) with the passageway 41B at a point downstream from the main valve member 42B.

A compression spring 162 is disposed between the housing part 138 and the end 149 of the lever 148 to tend to urge the lever 148 in a clockwise direction to open the ball valve 151.

However, this pivotal movement of the lever 148 is prevented by a bifurcated end 163 of the lever 148 bearing against the movable wall 143 of the temperature responsive device 144.

The chamber 139 of the control device 135 is interconnected by an outlet conduit 164, FIGURE 17, to an inlet 165 of an automatic safety valve 166.

The safety valve 166 has an outlet 167 leading to a main burner means 168 of an oven or the like by a conduit means 169. The outlet 167 is opened and closed by a valve member 170 cooperating with the valve seat 171.

The valve member 170 is adapted to be moved with a snap action from its closed position illustrated in FIGURE 17 to an open position when a temperature responsive device 172 senses that a large flame exists at the pilot burner 155, the interior of the temperature responsive device 172 being interconnected to a temperature sensing bulb 173 by a conduit means 174.

For example, the control device 135 is so constructed and arranged that at all times fuel is adapted to be interconnected from the fuel inlet 38B to the pilot burner 155 so as to produce a small flame 175 at the pilot burner 155.

However, when the valve member 151 is open so that fuel in the chamber 154 can additionally flow to the pilot burner 155, a large flame 176 will appear at the pilot burner 155 and heat the temperature sensing bulb 173 in such a manner that the same will cause the temperature responsive device 172 to snap open the valve member 170 to interconnect the source of fuel in the chamber 139 with the main burner means 168 which will be ignited by the large flame 176 of the pilot burner 155.

Thus, when the large flame 176 ceases to exist at the pilot burner 155, even though a small flame 175 is being produced, the temperature sensing device 173 will cause the temperature responsive device 172 to snap closed the valve member 170 whereby no fuel can issue from the main burner means 168.

The means for connecting the control knob 73B of the control device 135 with the fulcrum pin 44B and the valve member 42B is substantially identical to the means described for the control device 30 except that the lock means 102 on the washer 100B has been eliminated as is fully evident in FIGURE 20.

The operation of the control device 135 will now be described.

Even though the control knob 73B of the control device 135 is disposed in its "off" position, a small amount of fuel flows from the fuel inlet 38B through the housing means 136 to the conduit 156 leading to the pilot burner 155 whereby a small flame 175 is always in existence at the pilot controller burner 155.

The operator then turns the control knob 73B to the desired temperature setting whereby rotation of the control knob 73B drives the valve member 42B to its open position whereby the fuel inlet 38B is interconnected to the passage 41B at the low temperature setting of the control knob 73B. Further movement of the control knob 73B in a temperature increasing direction, permits the fulcrum pin 44B to be axially adjusted even though the valve member 42B is not being further rotated as the cam slot 76B has cammed the projection 84B of the drive member 82B out of engagement with the drive tang 116B.

When the fulcrum pin 44B has been adjusted to the desired temperature setting position thereof, it can be seen that as long as the temperature of the oven is below the selected temperature, the temperature responsive device 144 permits the lever 148, through the influence of the compression spring 162, to open the ball valve 151.

Since the temperature of the oven is below a safe temperature thereof, the removable wall 143 of the temperature responsive device 144 is disposed in such a position that the valve member 141 is disposed in its open position whereby fuel in the passage means 41B flows into the chamber 139 and through the conduit 164 to the closed safety valve 166.

The increased flow of fuel to the chamber 154' through the open ball valve 151 causes a flow of fuel through the conduit means 156 in such a manner that a large flame 176 will now exist at the pilot burner 155. When the large flame 176 exists at the pilot burner 155, the temperature responsive device 172 of the safety valve 166 snaps open the valve member 170 whereby fuel can flow from the chamber 139 through the valve member 166 to the main burner means 168 and be ignited by the flame 176 at the controller pilot 155.

When the temperature of the oven reaches the selected temperature, the movable wall 143 of the temperature responsive device 144 has moved to the left in FIGURE 18 in such a manner that the lever 148 will close the ball valve 151 whereby fuel in the chamber 154 is prevented from flowing to the controller pilot 155 so that the large flame 176 ceases to exist and only the small flame 175 is produced at the controller pilot 155. When the large flame 176 ceases to exist at the controller pilot 155, the temperature responsive device 172 of the safety valve 176 snaps closed the valve member 170 whereby the flow of fuel to the main burner means 168 is terminated.

Thereafter, should the temperature of the oven fall below the selected temperature, the movable wall 143 of the temperature responsive device 144 has moved to the right a distance sufficient to again open the ball valve 151 whereby the large flame 176 can exist at the controller pilot 155 to open the valve member 170 of the safety valve 166 so that fuel can again issue from the main burner 168.

Thus, it can be seen that the control device 135 of this invention will cycle the burner means 168 between its "off" and "on" positions to maintain the temperature of the oven at the temperature selected by the control knob 73B.

Should the temperature of the oven exceed a safe temperature at the broiling setting of the oven, the movable wall 143 of the temperature responsive device 144 will have moved to the left in FIGURE 18 a distance sufficient to move the valve member 141 toward the valve seat 140 to throttle down the flow of fuel to the main burner means 168 before the ball valve 151 will close so that a continuous flame broiling will be produced while preventing an unsafe temperature in the oven.

However, should an abnormal condition exist, whereby the valve 151 will not close for some reason, the valve member 141 will completely seat against the valve seat 140 when the temperature of the oven is above a safe predetermined temperature whereby the flow of fuel to the burner means 168 will be terminated by the safety valve means 141.

When it is desired to turn off the oven controlled by the control device 135 of this invention, the control knob 73B is turned back to its "off" position whereby the valve member 42B will be moved toward the closed position in the manner previously described for the control device 30.

Therefore, it can be seen that control devices 30, 125 and 135 of this invention have many parts which can be utilized interchangeably and require only slight modifications thereof to produce control devices for many varied uses.

Therefore, this invention not only provides improved control devices, but also this invention provides improved parts for such control devices or the like.

While the form of the invention now preferred has been disclosed as required by the statutes, other forms may be used, all coming within the scope of the claims which follow.

What is claimed is:

1. In combination, a housing means having a wall provided with a cam slot therethrough and having an inlet and an outlet, said cam slot having one edge thereof defining a cam surface means on said wall, a movable valve means for varying the degree of interconnection between said inlet and said outlet, a movable manipulator means carried by said housing means and having a drive means disposed on one side of said cam slot wall, and interconnection means for interconnecting said manipulator means with said valve means, said interconnection means being disposed on the other side of said cam slot wall and having a first part projecting through said cam slot to be moved within said slot by said drive means of said manipulator means and a second part drivingly connected to said valve member, said drive means of said manipulator means engaging said first part of said interconnection means to move said valve means until said cam surface means of said cam slot disengages said driving means of said manipulator means from said first part of said interconnection means during movement of said manipulator means in one direction.

2. In combination, a housing means having a wall provided with a cam slot therethrough and having two inlets and two outlets, said cam slot having one edge thereof defining a cam surface means on said wall, a pair of movable valve means for respectively varying the degree of interconnection between said inlets and said outlets, a movable manipulator means carried by said housing means for adjusting one of said valve means during the entire range of movement of said manipulator means, said manipulator means having drive means disposed on one side of said cam slot wall, and interconnection means for interconnecting said manipulator means with the other valve means, said interconnection means being disposed on the other side of said cam slot wall and having a first part projecting through said cam slot to be moved within said slot by said drive means of said manipulator means and a second part drivingly connected to said valve member, said drive means of said manipulator means engaging said first part of said interconnection means to move said other valve means until said cam surface means of said cam slot disengages said driving means of said manipulator means from said first part of said interconnection means during said range of movement of said manipulator means in one direction.

3. A combination as set forth in claim 2 wherein said one valve means is thermostatically controlled.

4. In combination, a housing means having a wall provided with a cam slot therethrough and having an inlet and an outlet, said cam slot having one edge thereof defining a cam surface means on said wall, a movable valve member for varying the degree of interconnection between said inlet and said outlet, a movable drive member disposed on one side of said cam slot wall and being interconnected to said valve member, said drive member having a projection extending through said cam slot and being engageable with said cam surface means, and a movable manipulator means carried by said housing means and having a first drive means disposed on the other side of said cam slot wall for engaging said projection to move said valve member in one direction until said cam surface means moves said projection out of engagement with said first drive means whereby further movement of said manipulator means in said one direction does not further move said valve member, said manipulator means having a second drive means disposed on said other side of said cam slot wall and being engageable with said projection to move said valve member in the other direction when said manipulator means is moved in the other direction.

5. A combination as set forth in claim 4 wherein said housing means carries temperature responsive means and wherein said manipulator means varies the setting of said temperature responsive means.

6. A combination as set forth in claim 4 wherein said manipulator means has a lock means that holds said manipulator means in its original position until said manipulator means is depressed to release said lock means.

7. In combination, a housing means having a wall provided with a cam slot therethrough and having an inlet and an outlet, said cam slot having one edge thereof defining a cam surface means on said wall, a movable valve member for varying the degree of interconnection between said inlet and said outlet, a movable drive member interconnected to said valve member and disposed on one side of said cam slot wall, said drive member having a projection extending through said cam slot and being engageable with said cam surface means, and a movable manipulator means carried by said housing means, said manipulator means having three ranges of movement in one direction and having three drive means disposed on the other side of said cam slot wall, one of said drive means engaging said projection to move said valve member during the first range of movement of said manipulator means whereby said cam surface means moves said projection out of engagement with said first drive means so that said manipulator means does not affect said valve member during the second range of movement of said manipulator means, the second drive means engaging said projection to further move said valve member during the third range of movement of said manipulator means, the third drive means engaging said projection to move said valve member back to its original position when said manipulator means is moved in the other direction to its original position.

8. A combination as set forth in claim 7 wherein said third drive means does not engage said projection until said manipulator means is moved in the other direction to closely adjacent the first range of movement of said manipulator means.

9. In combination, a housing means having a wall provided with a cam slot therethrough and having a face surface interrupted with an inlet and an outlet, said cam slot having one edge thereof defining a cam surface means on said wall, a rotary disc valve member for varying the degree of interconnection between said inlet and said outlet, a drive member movably interconnected to said valve member and being disposed on one side of said cam slot wall, said drive member having a projection projecting through said cam slot, and a manipulator means rotatably carried by said housing means, said manipulator means having a drive disc provided with a pair of tangs disposed on the other side of said cam slot wall, one of said tangs engaging said projection to rotate said valve member in one direction until said cam surface means moves said drive member to move said projection out of engagement with said one tang whereby further rotation of said manipulator means in said one direction does not further move said valve member, said other tang being engageable with said projection to rotate said valve member in the other direction when said other tang is rotated in the other direction by said manipulator means.

10. A combination as set forth in claim 9 wherein said housing means carries temperature responsive means and wherein movement of said manipulator means varies the setting of said temperature responsive means.

11. A combination as set forth in claim 9 and including a valve controlling lever carried by said housing, a fulcrum pin axially movable in said housing and having an end on which said lever is fulcrumed, said manipulator means being axially movable and engaging the other end of said pin whereby said fulcrum pin is adjusted by said axial movement of said manipulator means.

12. A combination as set forth in claim 11 wherein said manipulator means includes an adjusting screw engaging said other end of said pin.

13. A combination as set forth in claim 9 wherein said manipulator means has a lock means that holds said manipulator means in its original position until said manipulator means is depressed to release said lock means.

14. In combination, a housing means having a wall provided with a cam slot therethrough and having a face surface interrupted with an inlet and an outlet, said cam slot having one edge thereof defining a cam surface means on said wall, a rotary disc valve member for varying the degree of interconnection between said inlet and said outlet, a drive member movably interconnected to said valve member and being disposed on one side of said cam slot wall, said drive having a projection projecting through said cam slot, and a manipulator means rotatably carried by said housing means, said manipulator means having a drive disc provided with three tangs disposed on the other side of said cam slot wall and having three ranges of movement in one direction, one of said tangs engaging said projection to rotate said valve member during the first range of movement of said manipulator means whereby said cam surface means moves said drive member to move said projection out of engagement with said one tang so that said manipulator means does not affect said valve member during the second range of movement of said manipulator means, the second tang engaging said projection to further rotate said valve member during the third range of movement of said manipulator means, the third tang engaging said projection to rotate said valve means back to its original position when said manipulator means is rotated in the other direction to its original position.

15. A combination as set forth in claim 14 wherein said third tang does not engage said projection until said manipulator means is rotated in said other direction closely adjacent said first range of movement of said manipulator means.

References Cited

UNITED STATES PATENTS

| | | | |
|---|---|---|---|
| 1,952,440 | 3/1934 | Kelley | 236—102 |
| 2,112,503 | 3/1938 | Meacham | 236—102 X |
| 2,316,417 | 4/1943 | Gregg | 236—99 X |
| 2,363,451 | 11/1944 | Stockstrom | 236—99 X |
| 2,414,220 | 1/1947 | Alfery | 236—102 X |
| 2,610,679 | 9/1952 | Weber et al. | 158—130 |
| 3,215,349 | 11/1965 | Frendock | 236—99 |

EDWARD J. MICHAEL, *Primary Examiner.*